United States Patent [19]
Imose

[11] Patent Number: 4,623,254
[45] Date of Patent: Nov. 18, 1986

[54] METHOD AND APPARATUS FOR MEASURING THICKNESS OF A FILM

[75] Inventor: Kazuo Imose, Takarazuka, Japan

[73] Assignee: Teijin Limited, Osaka, Japan

[21] Appl. No.: 449,580

[22] Filed: Dec. 14, 1982

[30] Foreign Application Priority Data

Dec. 16, 1981 [JP] Japan ................................ 56-201506

[51] Int. Cl.⁴ ............................................. G01B 11/06
[52] U.S. Cl. .................................................. 356/381
[58] Field of Search ............... 356/381, 382, 433, 434, 356/435, 429, 430, 431

[56] References Cited

U.S. PATENT DOCUMENTS

| | | | |
|---|---|---|---|
| 2,517,330 | 8/1950 | Marenholtz | 356/382 |
| 2,549,402 | 4/1951 | Vossberg | 356/382 |
| 3,732,016 | 5/1973 | Deshayes et al. | 356/382 |
| 3,761,724 | 9/1973 | Dennis | 356/434 |
| 3,807,876 | 4/1974 | Nakahara et al. | 356/435 |
| 4,092,069 | 5/1978 | Fukuda et al. | 356/434 |
| 4,248,536 | 2/1981 | Hijikata | 356/434 |

OTHER PUBLICATIONS

Donohoe, "Measuring the Thickness of Plastic Films", NASA Tech. Briefs, vol. 4, No. 1, (Spring 1979), p. 100.

Primary Examiner—R. A. Rosenberger
Attorney, Agent, or Firm—Burgess, Ryan & Wayne

[57] ABSTRACT

A beam of light generated by a light source is separately applied to a measured film having unknown thickness and a reference film having a known thickness. The light transmitted through the measured film and the reference film are converted into electric signals which are electrically processed by a logarithmic operation circuit so as to produce a specific electric signal proportional to the difference between the thickness of the measured film and the reference film.

8 Claims, 7 Drawing Figures

METHOD AND APPARATUS FOR MEASURING THICKNESS OF A FILM

BACKGROUND OF THE INVENTION

1. Field of the Invention

The present invention relates to a method for measuring the thickness of a film, and more particularly to a method for in-process sequential measurement of the thickness of a continuous film of a high molecular weight polymer during the production of the film of high molecular weight polymer by utilization of its optical characteristics. The present invention also relates to an apparatus containing an optical and electric arrangement to carry out the method.

2. Description of the Prior Art

Recently, high molecular weight polymer films, such as polyester film, have been finding use in an increasing number of fields. At the same time, the quality requirements for these films have become more severe. One of such requirements is for even thickness. Accordingly, in the production of continuous films, it is necessary to carry out in-process thickness measurement. A typical method for in-line measurement of film thickness, disclosed in Japanese Unexamined Patent Publication No. 53-31155, employs an infrared ray thickness measuring device which includes two alternately switchable optical filters, one being used for transmitting an infrared ray of a peak-absorption wavelength that is strongly absorbed by the film to be measured and the other being used for transmitting an infrared ray of a non-absorption wavelength that is substantially not absorbed by the film. The two infrared rays are alternately passed through the same optical path.

This known method is very effective for stable sequential thickness measurement of films, but suffers from a problem. Specifically, when a large change in the film thickness occurs or when the atmospheric temperature changes, the transmittance of the infrared rays of both the peak-absorption and non-absorption wavelengths does not changes accordingly, thereby causing errors in measurement of the film thickness. Also, with small thicknesses of the measured film, the amount of infrared rays absorbed by the film is small, resulting in low sensitivity and accuracy of thickness measurement and making it difficult to the detect changes in the thickness of the continuous film. Further, the alternate use of the infrared rays of the peak-absorption wavelength and the non-absorption wavelength makes it impossible to continuously measure the film thickness and limit the response speed in the measurement. The latter problems are particularly serious since the recent production speed of the films is as high as several hundred meters per minute and the response speed of the in-process measurement of films is more than several dozen milliseconds.

SUMMARY OF THE INVENTION

An object of the present invention is therefore to provide a method for in-process measurement of the thickness of continuous films formed from high molecular weight polymers, during the production thereof.

Another object of the present invention is to provide a method for accurately measuring the thickness of the high molecular films varying in thickness from less than several $\mu m$ (micrometer) to several hundred $\mu m$.

A further object of the present invention is to provide an apparatus for carrying out the above-mentioned methods.

In accordance with one aspect of the present invention, there is provided a method for measuring the thickness of a film by the utilization of the optical characteristics of the film, such as the light absorption or light transmission. The method comprises the steps of applying a beam of incident light to both the film under measurement and a reference film made of the same material; detecting the amounts of light transmitted through the measured and reference films; calculating the ratio of the detected amount of light transmitted through the measured film to the detected amount of light transmitted through the reference film; and determining the thickness of the measured film on the basis of the calculated ratio.

In accordance with another aspect of the present invention, there is provided an apparatus for measuring the thickness of a film of a light molecular weight polymer by the utilization of optical characteristics of the film. The apparatus comprises a light source generating a beam of light, a unit for disposing measured and reference films at positions separate from one another, an optical unit for projecting the beam of light vertically on both the measured and reference films, and for receiving the light transmitted through the measured and reference films, a photoelectric converting unit for detecting a first electric signal corresponding to the light transmitted through the measured film and a second electric signal corresponding to the light transmitted through the reference film, and logarithmic operation unit for generating a further electric signal for the thickness of the measured film through the computation of the ratio of the first to second signal.

BRIEF DESCRIPTION OF THE DRAWINGS

The present invention will now be made more apparent from the ensuing description of embodiments with reference to the accompanying drawings, wherein.

DESCRIPTION OF THE PREFERRED EMBODIMENTS

Figure 1:
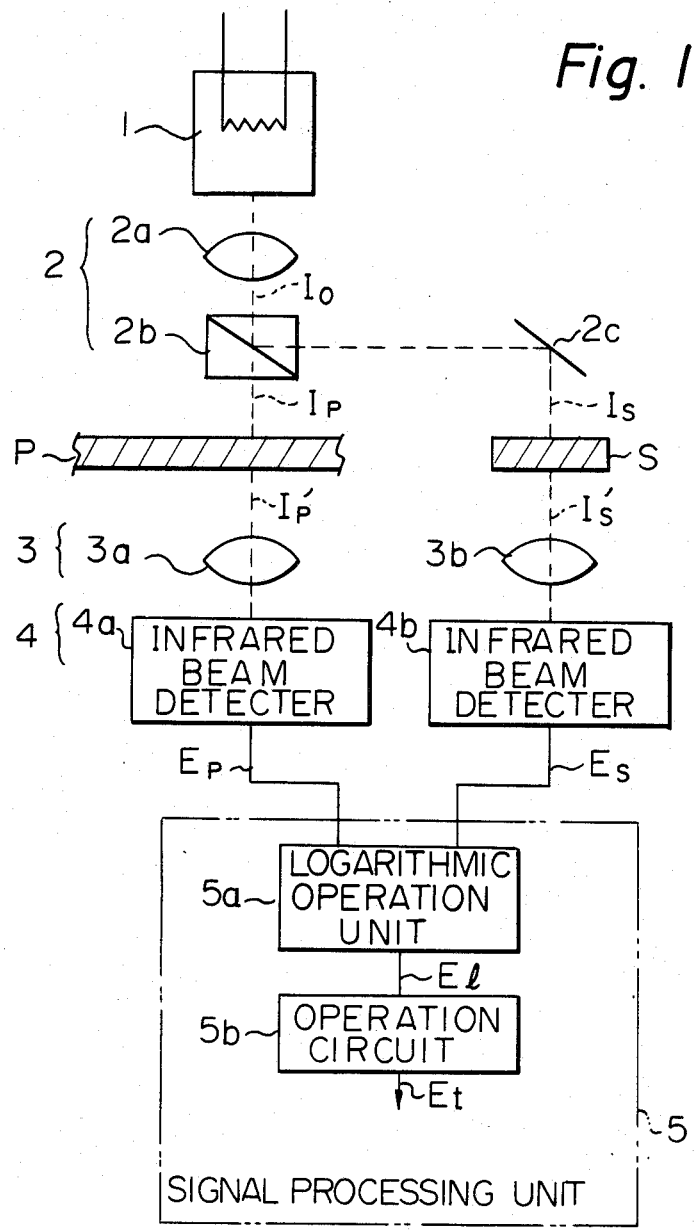
FIG. 1 is a schematic view of a thickness measuring arrangement embodying the present invention.

Referring now to FIG. 1, which illustrates an arrangement embodying the method of the present invention, a film P, for example, polyester film, is measured for thickness while running through the extrusion stage, casting or film-forming stage, and stretching stage of the production line.

A piece of film S made of the same material is used as a reference for the thickness measurement. The thickness of the reference film S is selected to correspond to the desired production thickness of the film P. Preferably, the reference film S comprises a piece of film cut out of the film P and inspected for accuracy.

A light source 1 is arranged for generating the beam of light for measurement of the thickness of the film P. In the case of a polyester film, a nichrome wire heater capable of generating an infrared beam Io having a wavelength of 5.8 μm is employed as the light source 1. This is because the absorption coefficient of polyester film against such an infrared beam is approximately 1.0. An optical projecting system 2 consisting of conventional optical elements, such as a convex lens 2a, a half mirror 2b, and a reflecting mirror 2c, splits the incident infrared beam Io into a measuring beam Ip incident upon the measured film P and a reference beam Is incident upon the reference film S. An optical receiving system 3 consisting of convex lenses 3a and 3b is provided for bringing a reference beam I's, transmitted through the reference film S, and a measuring beam I'p, transmitted through the measured film P, to a photoelectric converting unit 4 comprising of infrared beam detectors 4a and 4b having a high sensibility to the infrared beam. The infrared beam detectors 4a and 4b can be commercially available InSb semiconductors, for example, InSb detector No. IRS-311S manufactured by Fujitsu Limited, Japan. The infrared beam detectors 4a and 4b convert beams I'p and I's into electric signals Ep and Es, respectively. The magnitudes of electric signals Ep and Es are proportional to the amount of the infrared beam I'p and I's received by the detectors 4a and 4b.

A signal processing unit 5 is provided for producing an electric signal Et, corresponding to the thickness t of the measured film P by electrically processing the electric signals Ep and Es. The signal processing unit 5 includes a logarithmic operation unit 5a consisting of a pair of logarithmic amplifiers, for example, those manufactured and sold by Intersil Inc., U.S.A., under Part No. ICL 8048, and a conventional differential amplifier. The logarithmic operation unit 5a is provided for generating a signal E1 corresponding to the value log-(Ep)/(ES). The signal processing unit 5 also includes an operational circuit 5b consisting of a conventional operational amplifier. The operational circuit 5b is provided for adding the output signal E1 and a predetermined electric signal corresponding to the known thickness $t_o$ of the reference film S to produce the electric signal Et.

The principle of thickness measurement with the arrangement of FIG. 1 will now be described.

Assuming that the amount of the infrared beam Io projected from the light source 1 is $i_o$, the ratio of split of the beam of the half mirror 2b is d, and the transmittance of the polyester films P and S is μ, the amount $i'_p$ of the measuring beam I'p received by the infrared beam detector 4a and the amount $i'_s$ of the reference beam Is received by the infrared beam detector 4b are given by the following known equation of Beer's Law.

$$i'_p = K_p \cdot d \cdot i_o \cdot e^{-\mu t} \quad (a)$$

$$i'_s = K_s \cdot (1-d) \cdot i_o \cdot e^{-\mu t_o} \quad (b)$$

where Kp and Ks are proportional constants related to the reflection of the beams by the polyester films P and S, respectively. The infrared beam detectors 4a and 4b convert the amounts $i'_p$ and $i'_s$ into proportional electric signals Ep and Es, respectively. Therefore, if the conversion coefficients of both detectors 4a and 4b are assumed to be $l_p$ and $l_s$, the electric signal E1 from the logarithmic operation unit 5a is given by the following equation.

$$E_1 = \log \frac{EP}{ES} = \log \frac{l_p \cdot i'_p}{l_s \cdot i'_s} = \log \frac{l_p \cdot K_p \cdot d \cdot i_o \cdot e^{-\mu t}}{l_s \cdot K_s \cdot (1-d) \cdot i_o \cdot e^{-\mu t_o}} \quad (c)$$

$$= -\mu(t - t_o) + \log \frac{l_p \cdot K_p \cdot d}{l_s \cdot K_s \cdot (1-d)}$$

At this stage, it is to be understood that the reference film S and the measured film P are made of the same material and that the optical system for the reference film S is equivalent to that for the measured film P. That is, the above-mentioned proportional constants Ks and Kp can be considered to be approximately equal. As a result, if the split ratio d of the beam of the half mirror 2b is set to ½ and if the conversion coefficients $l_p$ and $l_s$ of the infrared beam detectors 4a and 4b are made equal, the item $$\log \frac{l_p \cdot K_p \cdot d}{l_s \cdot K_s \cdot (1-d)}$$

in equation (c) becomes approximately zero and therefore can be ignored. Accordingly, the equation (c) becomes $$E_1 = -\mu(t - t_o) \quad (d)$$

From equation (d), it will be understood that any variation of the thickness t of the measured film P from the known thickness $t_o$ of the reference film S can be detected by the measurement of the electric signal E1. This method of detection is very effective for stabilizing the electric processing operation of all signals by the electric elements and circuits used. Also, the detection can be very precise, since it is carried out through the electric measurement of the electric signal E1. Further, since the electrical processing operation to obtain the signal E1 is performed so as to detect the ratio of the amounts of the measuring beam Ip and the reference beam Is, changes in the performance of the light source 1, changes in the operating condition of the optical systems through which the measured and reference infrared beams Ip and Is pass, and changes in the performance of the infrared beam detectors 4a and 4b do not adversely affect the detection of the signal E1, as will be understood from equation (c). Thus, accurate detection of the thickness t of the measured film P can be obtained. The electric signal E1 is processed in the operational circuit 5b for compensation of the value to related $t_o$ the thickness to of the reference film S. As a result, the signal Et of the operational circuit 5b becomes $$Et = -\mu t \quad (e)$$

That is to say, the signal Et of the operational circuit 5b is an electric signal proportional to the thickness t of the measured film P.

From the foregoing description of the measuring principle, it will easily be understood that the above-mentioned method is advantageous for the continual measurement of the thickness of a sheet of film running along a predetermined path and that the employment of measuring elements and units having quick response characteristics enables a high measuring speed. The method of the present invention is also advantageous for the in-process measurement of the thickness of a thin polyester film. Further, the method and arrangement of FIG. 1 is applicable to the thickness measurement of films of high molecular weight polymers different from the above-described polyester film. However, the light beam used for the measurement has to be selected so as to be one that has a wavelength most suited to the optical characteristic (characteristic absorption band) of the film to be measured. That is to say, the beam of light used for embodying the method of the present invention may be selected from diverse kinds of beams, such as visible light, ultraviolet beam, and infrared and far infrared beams, in accordance with the optical characteristics of the measured film.

Figure 2:
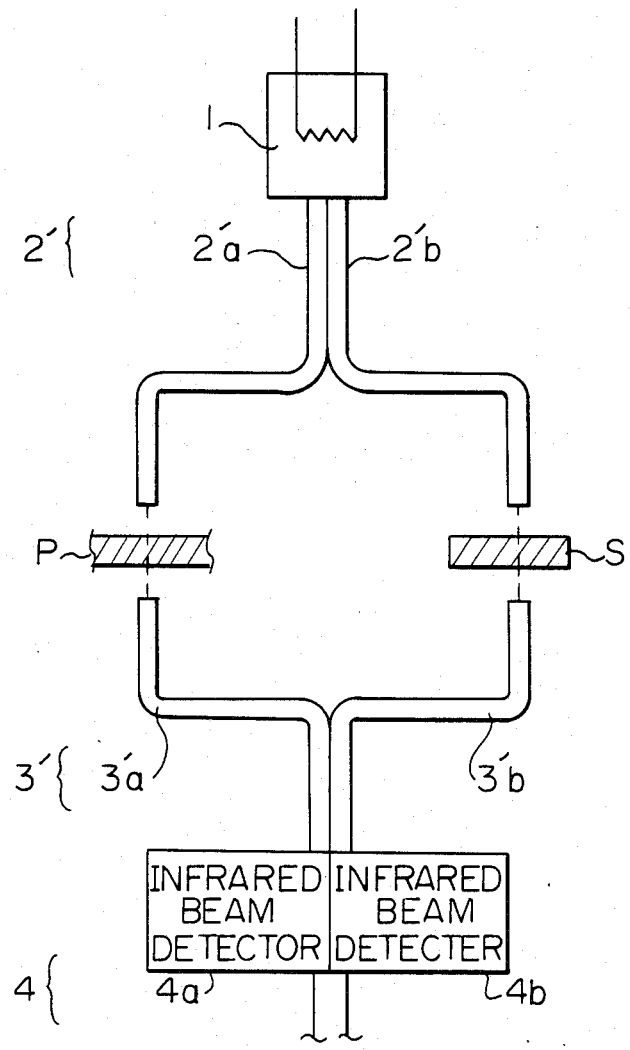
FIG. 2 is a schematic view of another measuring arrangement embodying the present invention.

In the measuring arrangement illustrated in FIG. 1, the optical projecting and receiving systems 2 and 3 can also comprise optical fibers. FIG. 2 illustrates an optical projecting system 2' consisting of a pair of optical fibers 2'a and 2'b and an optical receiving system 3' consisting of a pair of optical fibers 3'a and 3'b. The use of the optical fibers is very effective for eliminating possible errors caused by outside light or optical disturbances in the optical path. The use of the optical fibers is also effective for achieving compact arrangement of the photoelectric converting unit 4. The use of the optical fibers together with a pair of infrared beam detectors 4a and 4b having the same photoelectric characteristics is, particularly, very effective for simplifying the overall optical systems of the measuring arrangement of the present invention.

Naturally, the optical systems of the measuring arrangement may be formed by combination of an optical projecting system employing a lens and mirrors and an optical receiving system employing optical fibers. Further, a known beam splitter or a swingable mirror may be used for splitting the beam of light generated by the light source 1. The light source 1 may be formed by a laser if the overall measuring arrangement is appropriately designed, depending on where the measurement is carried out and what kind of high molecular weight material the measured film is made of.

In the signal processing unit 5 of the measuring arrangement of FIG. 1, the operational circuit 5b may be deleted if it is not necesary to detect the electric signal E1 that is directly related to the absolute dimension of the thickness t of the measured film P. For example, if the measuring arrangement of FIG. 1 is employed for detecting a variation in the thickness t of the measured film P during the manufacturing process thereof, the output signal E1 of the logarithmic operation unit 5a may directly be impressed to a suitable electrical comparison circuit for comparing the signal E1 with predetermined upper and lower variation limits. In that case, the thickness $t_0$ of the reference film S may be different from that aimed at by the production requirement of the measured film P, but should preferably be chosen so as to be equal to either the upper or lower limit thickness of the measured film P.

Further, in the method carried out by the arrangement of FIG. 1, it is not essential that the item $$\log \frac{I_p \cdot K_p \cdot d}{I_s \cdot K_s \cdot (I_d)}$$

of equation (c) be substantially zero. If the value of that item is constant, it may be cancelled by the operational circuit 5b of the signal processing unit 5.

In the method of the present invention, it is very important to employ a reference film S made of the same material as a measured film P so that the reference and measured films S and P have the same light transmitting property or the same light absorbing property. Therefore, the reference film S should be a piece of film taken out of the same porduction line as the film P to be actually measured.

The arrangement of FIG. 1 may be provided so as to measure the thickness of either the as-cast film delivered from the casting stage of the film production process or the oriented film delivered from the stretching stage. Alternatively, the arrangement may be provided so as to measure the thickness of both the as-cast film and the oriented film. If an appropriate conventional transversing mechanism is additionally employed, the measuring method of the present invention is applicable to thickness measuring of the high molecular continuous film in the transverse direction across the width of the film in addition to the lengthwise direction.

Figure 3:
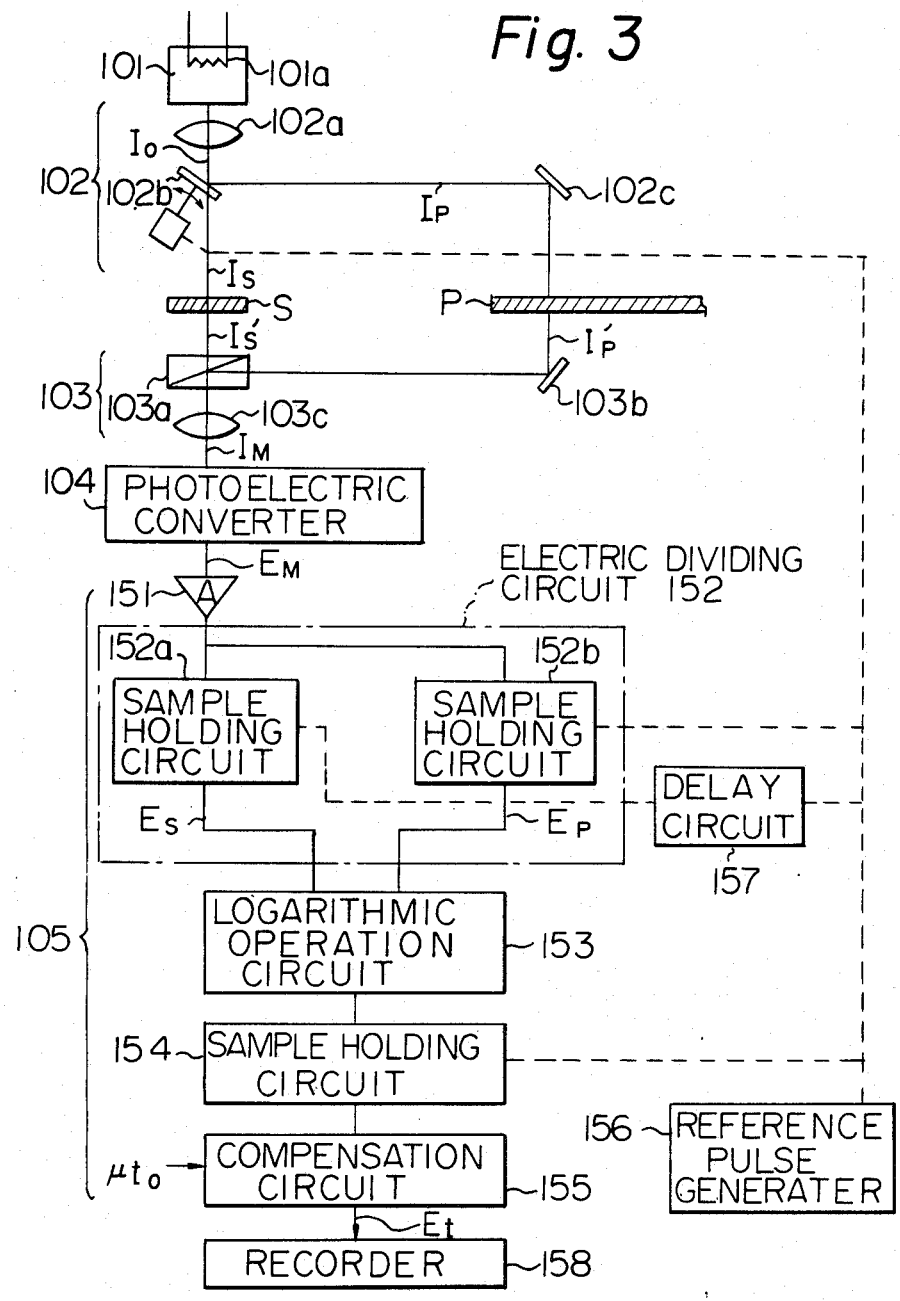
FIG. 3 is a schematic view of a further measuring arrangement embodying the present invention.

FIG. 3 illustrates another arrangement for measuring the thickness of the film of high molecular weight polymers according to the present invention. The following description will be made in reference to the case where the measured film is again a polyester film.

Figure 4:
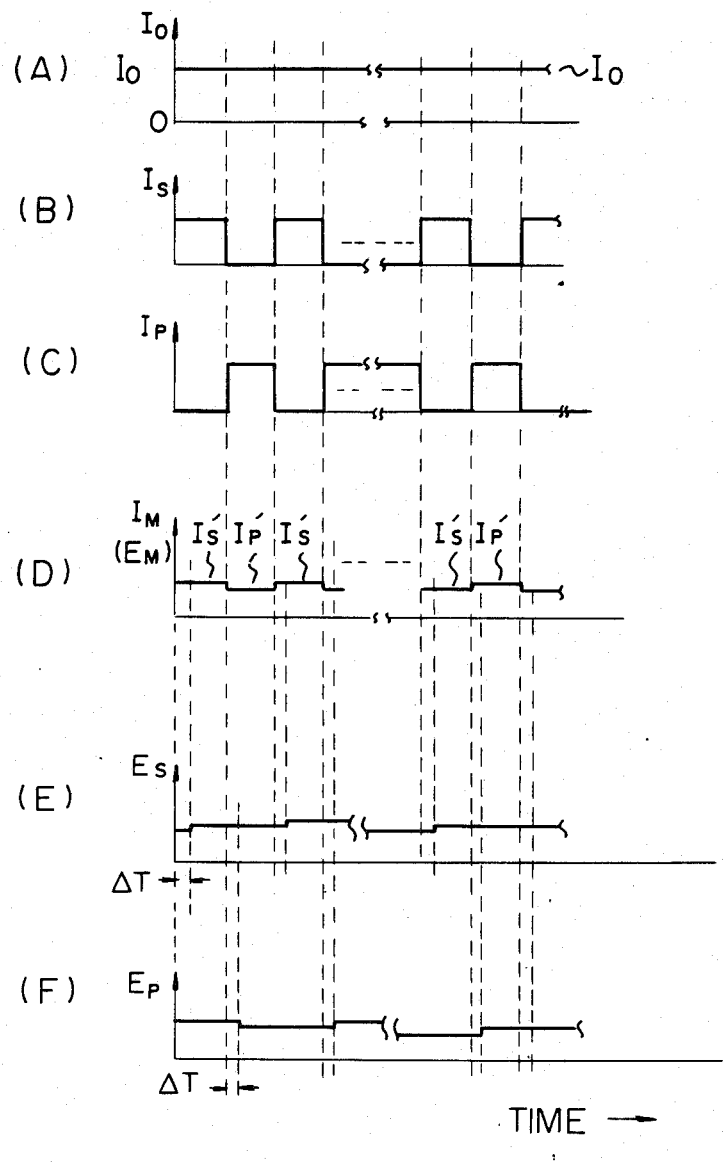
FIG. 4 is a diagram illustrating the shape of signals related to the arrangement of FIG. 3.

Referring to FIG. 3, a light source 101 consisting of a nichrome wire heater 101a generates an infrared beam Io having a wavelength of 5.8 μm, against which beam Io the absorption coefficient of the polyester film is approximately 1. An optical projecting system 102 consists of a light collecting lens 102a, a tuning-fork-controlled swinging mirror 102b and a fixed reflector mirror 102c. The swinging mirror 102b is arranged for dividing the infrared beam Io into a measuring beam Ip and a reference beam Is in the time division manner. That is, when the swinging mirror 102b comes into the path of the infrared beam Io, the beam Io is deflected 90 degrees toward the reflector mirror 102c so as to form the measuring beam Ip. The measuring beam Ip is then brought by the reflector mirror 102c toward the measured film P. On the other hand, when the swinging mirror 102b is away from the path of the infrared beam Io, the beam Io advances as the reference beam Is toward the reference film S. The motion of the swinging mirror 102b is controlled to a predetermined swinging frequency. Thus, the infrared beam Io as shown in (A) of FIG. 4 is divided into the beam Is, consisting of a train of optical pulses as shown in (B) of FIG. 4, and the beam Ip, consisting of another train of optical pulses as shown in (C) of FIG. 4. The phase of the former pulse train is 180 degrees different from that of the latter pulse train. The measuring beam transmitted through the measured film P is identified by I'p, while the reference beam transmitted through the reference film S is identified by I's in FIGS. 3 and 4.

The reference beam I's and the measuring beam I'p are brought by an optical receiving system 103 toward a single common photoelectric converter 104. The optical receiving system 103 consists of a beam synthesizer 103a, for example, a half mirror, a reflector mirror 103b, and a beam collecting lens 103c The beam synthesizer 103a generates a synthesized beam Im which consists of an alternate arrangement of optical pulses I'p and I's, as shown in (D) of FIG. 4.

The photoelectric converter 104 converts the synthesized beam Im into an electric signal Em proportional to the amount of the beam Im. The photoelectric converter 104 may consist of an infrared beam detector, such as an InSb semiconductor as described previously with reference to FIG. 1.

A signal processing unit 105 is provided for generating an electric signal Et corresponding to the thickness t of the measured film P. The unit 105 includes an electric amplifier 151 for amplifying the electric signal Em to the level suited for the electric processing thereof. The unit 105 also includes an electric dividing circuit 152 for dividing the amplified electric signal Em into an electric reference signal Es converted from the reference beam I's and an electric measuring signal Ep converted from the measuring beam I'p. The electric dividing circuit 152 includes two sampl and holding circuits 152a and 152b which operate in synchron with the motion of the swinging mirror 102b. The unit 105 further includes a logarithmic operation circuit 153 for generating an electric signal, E1 corresponding to the value of log(Ep)/(Es) and a sample and holding circuit 154 for selectively issuing a part of the electric signal E1 which is synchronized with the signal Ep issued from the sample and holding circuit 152b. The signal issued from the sample and holding circuit 154 is processed by a compensation circuit 155 so that the signal E1 is added with a compensation signal $Et_o$ corresponding to the thickness $t_o$ of the reference film S. That is, the compensation circuit consists of a conventional adder. A reference pulse generater 156 is arranged for generating reference pulses, such as clock pulses, to synchronize the operation of the electric dividing circuit 152 and the sample and holding circuit 154 with the motion of the swinging mirror 102b. A delay circuit 157 is arranged for giving a 180 degree phase difference between the reference pulses to the sample and holding circuit 152a and those to the other sample and holding circuit 152b. A recorder 158 may be provided for recording the electric signal Et indicating the thickness t of the measured film P. All of the optical elements and the electric elements or circuits described above are conventional, therefore, a detailed description of the individual elements and circuits is omitted.

The principle of thickness measurement with the above-mentioned arrangement of FIG. 3, will now be described.

Assuming that the amount of the infrared beam Io is $i_o$, and that the transmittance of the reference and measured films S and P made of the same material is $\mu$, the amount $i_p'$ of the pulsive measuring beam I'p transmitted through the measured film P and the amount $i_s'$ of the pulsive measuring beam I's transmitted through the reference film S are given by the following known equations.

$$i_p'(n) = Kp \cdot i_o(n) \cdot e^{-\mu t(n)} \quad (a)$$

$$i_s'(n) = Ks \cdot i_o(n) \cdot e^{-\mu t_o} \quad (b)$$

where Kp and Ks are proportional constants related to the reflection of the beams by the films P and S, respectively, and n is the sampling time.

The measuring beam I'p and reference beam I's are synthesized by the synthesizer 103a to the synthesized beam Im. The synthesized beam Im is converted by the photoelectric converter 104 into an electric signal Em. The electric signal Em is then divided by the electric dividing circuit 152 into the electric measuring and reference signals Ep and Es. These electric signals Ep and Es are subsequently processed by the logarithmic operation circuit 153. At this stage, the shapes of the two electric signals Es and Ep issued from the sample holding circuits 152a and 152b, respectively, are stepped as shown in (E) and (F) of FIG. 4. In these two diagrams, $\Delta T$ indicates the time delay for cancelling the influence of the delay of the photoelectric conversion. As shown in (E) and (F) of FIG. 4, there is a 180 degree phase difference between the two electric signals Es and Ep. That is, there is a time difference corresponding to one sampling time between the two electric signals Es and Ep. Therefore, the electric output E1 of the logarithmic operation circuit 153 is given by the following equation.

$$E1(n) = \log \frac{Ep(n)}{Es(n-1)} = \log \frac{l_o(n) \cdot i'_p(n)}{l_o(n-1) \cdot i'_s(n-1)} \quad (c)$$

$$= \log \frac{l_o(n) \cdot Kp \cdot i_o(n) \cdot e^{-\mu t(n)}}{l_o(n-1) \cdot Ks \cdot i_o(n-1) \cdot e^{-\mu t_o}}$$

$$= -\mu(t(n) - t_o) + \log \frac{l_o(n) \cdot Kp \cdot i_o(n)}{l_o(n-1) \cdot Ks \cdot i_o(n-1)}$$

where $l_o(n)$ is a conversion coefficient of the photoelectric converter 104.

At this stage, if $l_o(n)$ is equal to $l_o(n-1)$ and if $i_o(n)$ is equal to $i_o(n-1)$, the item $$\log \frac{l_o(n) \cdot Kp \cdot i_o(n)}{l_o(n-1) \cdot Ks \cdot i_o(n-1)}$$

of equation (c), above, becomes constant. That is, equation (c) is rewritten to the following equation (c')

$$E1(n) = -\mu(t(n) - t_o) + \text{const.} \quad (c')$$

This means that if equation (c') is established, the measuring process can be very stable. Equation (c') can be established if the sampling speed, i.e., the frequency of the motion of the swinging mirror 102b, is high enough to enable it to ignore variation in the operation of the light source 101 and the photoelectric converter 104. Preferably, the frequency of the motion of the swinging mirror 102b should be less than several milliseconds. Further, since the measured film P and the reference film S are made of the same material, if the optical characteristics of the optical elements used are chosen so as to establish the condition that the coefficients Ks and Kp are approximately equal, the item $$\log \frac{l_o(n) \cdot Kp \cdot i_o(n)}{l_o(n-1) \cdot Ks \cdot i_o(n-1)}$$

of equation (c) can be made approximately zero and be ignored. As a result, the signal E1 can be given by the following equation.

$$E1 = -\mu(t - t_o) \quad (d)$$

From equation (d), above, it will be understood that any variation of the thickness t of the measured polyester film P from the known thickness $t_o$ of the reference polyester film S can be detected by the measurement of the electric signal E1. This method of obtaining the signal E1 by the use of the logarithmic operation circuit 153, i.e., the method of detecting a variation of the thickness t from the known thickness $t_o$, is very effective for stabilizing the electrical processing of the signals by the electric elements and circuits used. As a result, the detection of the thickness variation per se can be made sensitive and stable. Further, the method of detecting the ratio of the measuring beam I′p to the reference beam I′s is effective for cancelling any variation in the operation of the light source 101, the optical condition of the optical paths through which these two beams I′p and I′s pass, and the operation of the photoelectric converter 104. Thus, the detection of the above-mentioned ratio can be always stable.

The sample and holding circuit 154 connected to the above-mentioned logarithmic operation circuit 153 can operate so as to sample and hold the signal E1(n) coming from the circuit 153 only when the signal E1(n) is sufficiently stabilized before it enters into the circuit 154. Therefore, the intermittent output signal issuing from the sample and holding circuit 154 can be considered the same as a continuous signal. The electric signal from the sample and holding circuit 154 is supplied into the compensation circuit 155 in which a compensation operation is carried out to cancel the component $t_o$ of the signal E1, which component corresponds to the known thickness $t_o$ of the reference film S. As a result, a continuous signal Et given by the following equation is issued from the compensation circuit 155.

$$Et = -\mu t \tag{e}$$

The signal Et of equation (e) is recorded by the recorder 158. Alternatively, the signal Et may be used to control the production process of the measured polyester film P. The signal Et is proportional to the actual thickness t of the measured film P. Thus, it is possible to carry out continuous measurement of the actual thickness t of the measured film P by detecting the signal Et. Further, since the high speed photoelectric converter 104 is employed, quick detection of the signal Et can be accomplished. Accordingly, the measuring method described above is suited for an in-process measurement of the actual thickness of a film.

The foregoing description based on FIGS. 3 and 4 was made in reference to the case of measuring the thickness of a polyester film. However, it will easily be understood that the measuring method based on the arrangement of FIG. 3 is equally applicable to the thickness measurement of diverse kinds of films of high molecular weight polymers other than polyester film. Further, the measuring beam is not limited to the infrared beam and may be chosen from diverse kinds of light having diverse wavelengths in accordance with the optical characteristics of the film to be measured. Therefore, the measuring beam may be an ultraviolet beam, visible light beams, infrared or far infrared beams, etc.

Further, the arrangement of FIG. 3 may employ optical fibers, as described in connection with the arrangement of FIG. 1, for forming the optical path. The tuning-fork-controlled mirror 102b used in the arrangement of FIG. 3 may be replaced with a combination of a half mirror and an appropriate optical chopper device if it is possible to bring the measuring beam from the light source 101 to the photoelectric converter 104 via both the measured and reference films.

In the arrangement of FIG. 3, the beam dividing operation by the swinging mirror 102b is performed so that the measuring beam Io from the light source 101 is always projected onto one of the measured and reference films P and S without any inter Further, the sampling operation of the sample and holding circuits 152a, 152b, and 154 is controlled by the reference pulse generator 156 so that the sampling timing is synchronized with the swinging motion of the swinging mirror 102b. However, the division of the measuring beam may be made in a manner that the measuring beam is intermittently brought to the measured and reference films P and S. Also, the sampling operation of the sample and holding circuits may be carried out in a different way if it is possible to ignore variations in the operation of the light source, the operation of the photoelectric converter, and the optical characteristics of the optical paths. For example, in the case where the measured film P is scanned by the measuring beam across the width of the film P to measure the average thickness of the film P, the measuring beam transmitted through the reference film S may be sampled each time one scanning of the measuring beam is carried out.

In the arrangement of FIG. 3, the dividing circuit 152 and the logarithmic operation circuit 153 may be replaced with a conventional microprocesser device. Further, as in the case of the arrangement of FIG. 1, the electric signal E1 from the logarithmic operation circuit 153 may be used for inspecting variation of the actual thickness of the measured film P from the known thickness of the reference film S. In this connection, the thickness of the reference film S should be appropriately chosen depending on whether any change in the actual thickness of the film from the known reference thickness of the reference film or the actual thickness of the film per se should be measured. However, it is necessary that the reference film be made of the same material as the measured film so that both films have the same optical characteristics. Preferably, the reference film S should be a piece of film cut out of the production line of the measured film P.

At this stage, it should be understood that the arrangement of FIG. 3 can be simpler than that of FIG. 1. This is because in the arrangement of FIG. 3, a single common photoelectric converter and a single amplifier are employed, while in the arrangement of FIG. 1, a pair of photoelectric converters as well as a pair of amplifiers are employed. In the latter arrangement, it is always necessary that the electric properties of the two converters and those of the two amplifiers be kept equal.

Figure 5:
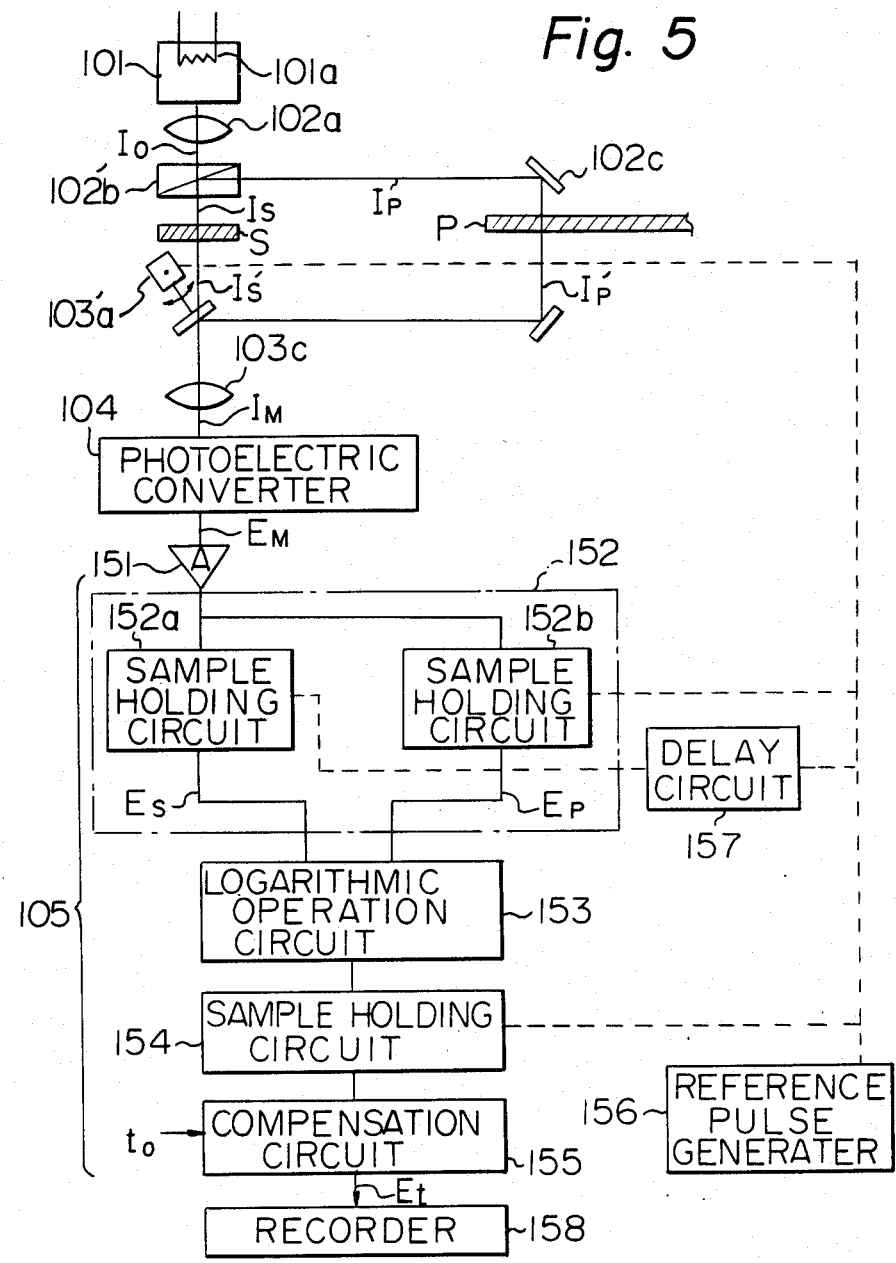
FIG. 5 is a schematic view of a still further measuring arrangement embodying the present invention.

FIG. 5 illustrates a modification of the arrangement of FIG. 3. In the arrangement of FIG. 5, the tuning-fork-controlled swinging mirror 102b of FIG. 3 is replaced with a fixed half mirror 102′b. Also, the synthesizer 103a of FIG. 3 is replaced with a tuning-fork-controlled swinging mirror 103′a similar to the mirror 102b of FIG. 3. The remaining portion of the arrangement of FIG. 5 is the same as that of FIG. 3. The measuring operation of the arrangement of FIG. 5 is substantially the same as that of the arrangement of FIG. 3. Therefore, the arrangement of FIG. 5 is also adapted to be used for an in-process measurement of the thickness of a high molecular film.

Figure 6:
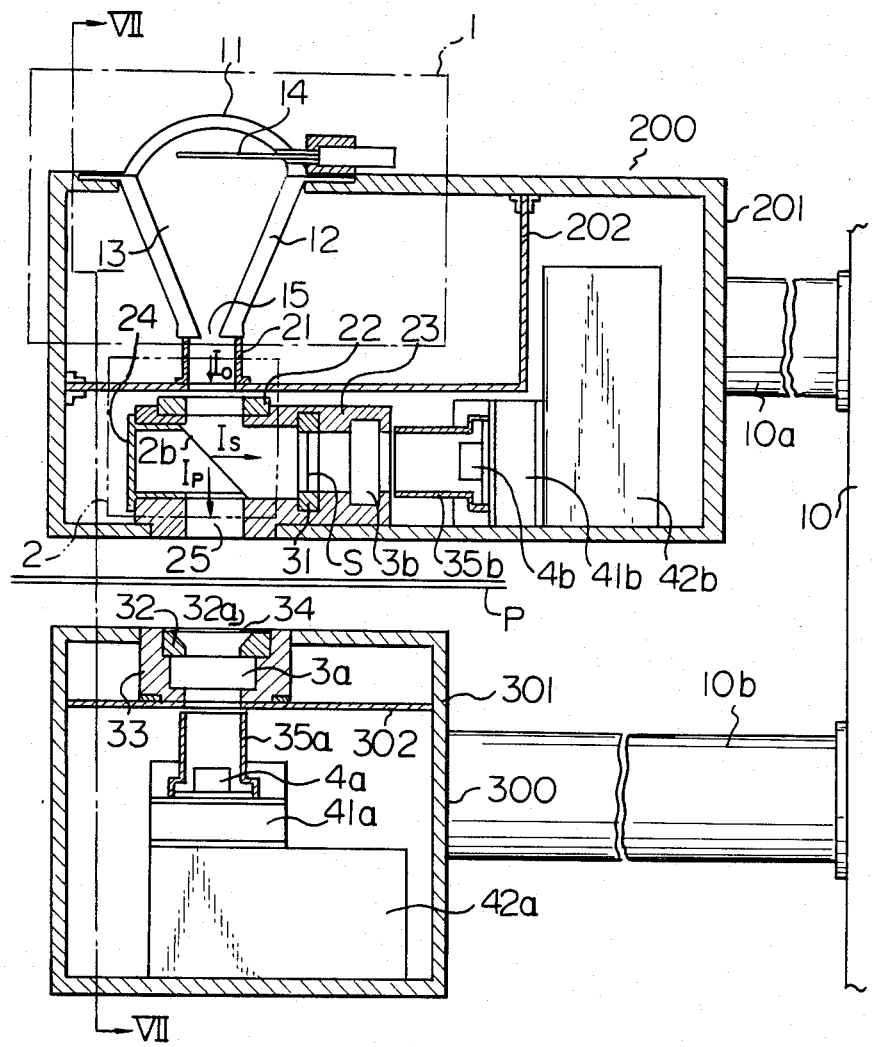
FIG. 6 is a cross-sectional view of an apparatus according to the present invention.
Figure 7:
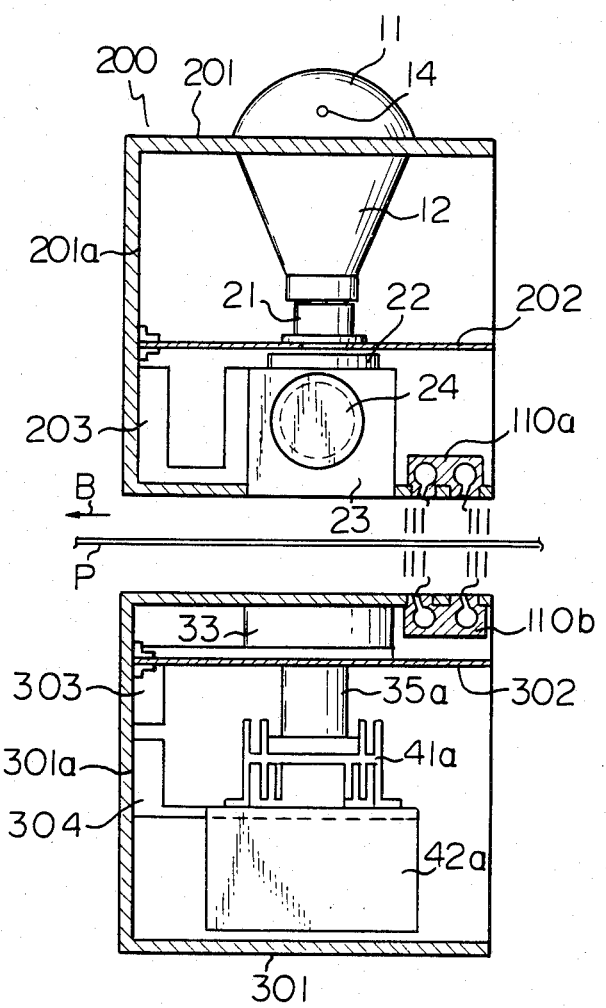
FIG. 7 is a cross-sectional view taken along the line VII—VII of FIG. 6.

FIGS. 6 and 7 schematically illustrate an example of an apparatus incorporating therein a film-thickness measuring arrangement which substantially corresponds to the arrangement of FIG. 1. In FIGS. 6 and 7 the same reference numerals as those in FIG. 1 designate identical elements. The apparatus of FIGS. 6 and 7 has a rigid frame work 10 on which an upper measuring head 200 and a lower measuring head 300 are supported via cantilever arms 10a and 10b. The upper arm 10a and the lower arm 10b are vertically spaced apart from one another so as to give a predetermined space between the upper head 200 and the lower head 300. The upper and lower heads 200 and 300 are encased in upper and lower casings 201 and 301, respectively, so as to avoid contamination by dirt and foreign matter. The above-mentioned support of both heads 200 and 300 by the use of the cantilever arms 10a and 10b is effective for maintaining alignment of the optical axis of the upper head 200 with that of the lower head 300 even with vibration transmitted from a floor. A measured film P is conveyed through the space between the upper and lower heads 200 and 300. The film P is subjected to the continuous thickness measurement when it goes underneath the upper head 200.

The upper head 200 is provided therein with a light source 1, an optical projecting system 2, a reference film S, a light collecting lens 3b, and a photoelectric converter 4b. The lower head 300 is provided with an optical receiving system 3, having a light collecting lens 3a, and a photoelectric converter 4a. That is to say, since the light source 1 and all the optical and electric elements related to the reference film S are compactly accommodated in the upper head 200, stable thickness measurement of the reference film S is ensured. Further, since the lower head 300 does not incorporate therein any optical or electrical elements related to the reference film S, no operation for adjusting the positional relationship between the upper and lower heads 200 and 300 is necessary, except for adjustment to accurately introduce a measuring beam Ip from the upper head 200 into the light collecting lens 3a of the lower head 300. As a result, the assembly operation of the entire apparatus is very easy.

The light source 1 is provided with an upper covering 11, a conical body 12, and a heater 14. The upper covering 11 has therein a light reflecting wall in the shape of a partial sphere or a partial parabolic surface. The reflecting wall of the upper covering 11 is continuously interconnected with a conical light reflecting wall of the conical body 12. The upper covering 11 and the conical body 12 define therein a light generating chamber 13. The rod heater 14 laterally projects from the reflecting wall of the upper covering 11 into the chamber 13 so as to pass through the focus point of the spheric or parabolic reflecting wall of the covering 11. The heater 14 is a conventional sheathed tubular heater coated with ceramic. The heater 14 has therein a thermocouple, isolated from the heating wire thereof, to control the temperature of the heater 14.

The heater 14 can generate, in the low temperature range, a measuring infrared beam having an intermediate or long wavelength. The generated infrared beam is directed through an opening 15 toward the optical projecting unit 2. Experiments show that when the diameter of the opening 15 is chosen to be 8 millimeters, the heater 14 heated up to 290° C. could generate an infrared beam of 5.8 μm wavelength. The intensity of that infrared beam was as strong as that generated by a heater made of a tungsten wire and heated up to 1500° C. At this stage, it is to be understood that the light reflecting walls of the upper covering 11 and the conical body 12 are enveloped by an appropriate outer covering so that air heated to a predetermined temperature and predetermined humidity can be supplied under a predetermined pressure between the light reflecting walls and the outer covering. The infrared beam is generated at random by the heater 14 toward diverse directions and in different time phases. This is very effective for compensating for measuring error caused by the wave motion of the measuring film P conveyed between the upper and lower heads 200 and 300 during the thickness measuring process. Further, such a generated infrared beam is effective for preventing optical interference in the case of a thin measuring film. Still further, provision of the thermally controlled heater 14 is effective for stable generation of an infrared beam for a long period of time. Thus, such a heater is economical.

The measuring beam Io is divided by a half mirror 2b held by a removable mirror holder 24 into a reference beam Is and a measuring beam Ip after passing through the optical path of a cylindrical covering 21 having an inner mirror wall and a filtering element 22. The reference beam Is is brought toward the reference film S held by an exchangeable film holder 31. Subsequently, the reference beam Is transmitted through the reference film S is brought by an optical path unit 23 toward the light collecting lens 3b. Thereafter, the reference beam Is is brought by the guide of a cylindrical mirror tube 35b toward the photoelectric converter 4b, which converts the reference beam into the corresponding electric signal Es. A heat disperser 41b is arranged adjacent to the photoelectric converter 4b. An auxiliary circuit 42b is arranged so as to be operatively interconnected with the photoelectric converter 4b.

The measuring beam Ip is projected through an optical projecting port 25 onto the measured film P. The measuring beam Ip transmitted through the measured film P is then introduced into the light collecting lens 3a held by an optical receiving unit 33. Thereafter, the measuring beam Ip is brought toward the photoelectric converter 4a under the guidance of a cylindrical mirror tube 35a. Thus, it is converted by the photoelectric converter 4a into the corresponding electric signal Ep. An optical collecting unit 32 positioned above the light collecting lens 3a has an optical receiving port 32a, the diameter of which is 1.5 to 3 times larger than that of the optical projecting port 25. Preferably, a light transmitting mask 34 having a central slit is arranged at the uppermost position of the optical receiving port 32a. The provision of the mask 34 having a central slit is effective for improving the resolution performance of the thickness measurement. The light transmitting mask 34 is made of, for example, a polyester film.

In the above construction of the apparatus of the present invention, since the measuring beams Io, Ip, and Is are all guided by the cylindrical mirror tubes 21, 23, 35a, and 35b there is very little light loss. Also, outside light does not adversely affect the thickness measurement. A partition 202 is arranged for providing thermal separation between the light source 1 and the measuring unit of the reference film S. A partition 302 is arranged for thermally isolating the optical receiving unit 33 from the measuring unit of the measured film P. In the chambers separated by the partitions 202 and 302, air having a predetermined temperature and predetermined humidity is supplied under a predetermined pressure by means of appropriate air conduit. Therefore, the insides of both the upper and lower heads 200 and 300 are always kept at a predetermined temperature and humidity level. As a result, stable thickness measurement is ensured.

Air-curtain units 110a and 110b shown in FIG. 7 have air injection ports 111 through which controlled temperature and humidity air streams are injected toward the measured film P running in the direction of the arrow B. That is to say, the injected streams of air form air curtains extending in the direction of the width of the measured film P at the entrance of the film P from the outside into the apparatus. This air curtains are effective for interrupting the stream of air produced by the running of the measured film P before the measured film P reaches the measuring stage of the apparatus. Thus, only a limited amount of temperature and humidity controlled air follows the measured film P. This further ensures stable thickness measurement of the measured film P.

The inside of the upper and lower heads 200 and 300 are painted black so that the thickness measurement is not disturbed by the outside light. Reference numerals 203, 303, and 304 designate mounting elements attached to reference surfaces 201a and 301a of the upper and lower heads 200 and 300. The provision of such mounting elements enables assembly of all optical and electric elements in such a manner that correct optical relationship amoung all systems and elements are established.

Although the invention has been described with particular reference to specific embodiments, various modifications and variations are possible in light of the above teachings.

I claim:

1. An apparatus for measuring a thickness of a high molecular film by the utilization of optical characteristics of the film, comprising:
   an upper head;
   a lower head; and
   a common support means for supporting thereon said upper and lower heads while heaving a space therebetween for permitting a sheet of measured film to be continuously conveyed therethrough without any contact with both said upper and lower heads;
   said upper head comprising a light source means generating an incident beam of light, an optical splitting means for splitting the incident beam of light into a reference beam of light and a measuring beam of light, a film holder for holding a reference film to be transmitted by said reference beam of light, a light collecting lens to bring said reference beam of light toward a first photoelectric converter, after said reference beam has been transmitted through said reference film, for generating a first electric signal corresponding to said reference beam of light, and a light projecting means having a port through which said measuring beam of light is projected onto said measured film conveyed in said space between said upper and lower heads;
   said lower head comprising a light receiving means for receiving said measuring beam of light after said measuring beam has been transmitted through said measured film and a second photoelectric converter for generating a second electric signal corresponding to said measuring beam of light coming from said light receiving means, said light receiving means including a light collecting means having a light receiving port 1.5 to 3.0 times larger than said port of said light projecting means and a light collecting lens.

2. The apparatus according to claim 1 wherein said light source means comprises a spherical or parabolic light reflecting mirror continuously interconnected with a vertically downwardly converging conical light reflecting mirror, said light reflecting mirrors defining a heat generating chamber, and a heating means disposed at a focal point of said spherical or parabolic light reflecting mirror, said heating means generating said incident beam of light.

3. The apparatus according to claim 2, wherein said heating means includes a sheathed tubular heater coated with ceramic and including thermocouple means, isolated from a heating wire of said heating means, to control the temperature of said sheathed tubular heater.

4. The apparatus according to claim 1, wherein said upper and lower heads are each provided therein with light guiding means through which said reference and measuring beams of light pass, respectively.

5. The apparatus according to claim 1, wherein said upper head is provided with a partition means for defining a first chamber in which said light source means is arranged and a second chamber in which said optical splitting means, said film holder holding said reference film, said light collecting lens, and said first photoelectric converter and said light projecting means are arranged, said first and second chambers being supplied with temperature and humidity controlled air under a predetermined pressure.

6. The apparatus according to claim 5, wherein said lower head is provided with a partition wall for isolating a first chamber in which said light receiving means is arranged from a second chamber in which said second photoelectric converter is arranged, said first and second chambers being supplied with temperature and humidity controlled air under a predetermined pressure.

7. The apparatus according to claim 1, wherein said upper and lower heads comprise air injection means for injecting streams of air toward upper and lower surfaces of said measured film, said streams of air forming an air curtain through which said measured film is conveyed.

8. The apparatus according to claim 1, wherein said light source means comprises a low temperature heater generating an infrared beam, said low temperature heater heing under the control of temperature controlling means.

* * * * *